United States Patent
Sordo Miralles et al.

(10) Patent No.: US 8,965,419 B2
(45) Date of Patent: Feb. 24, 2015

(54) SYSTEM FOR INTERCONNECTING A REMOTE SERVER WITH A SHORT MESSAGE SERVER CENTRE (SMSC) VIA THE INTERNET

(75) Inventors: Arturo Sordo Miralles, Mountain View, CA (US); Santiago Borrero Ortiz, Madrid (ES)

(73) Assignee: Vodafone Group PLC, Newbury Berkshire (GB)

( * ) Notice: Subject to any disclaimer, the term of this patent is extended or adjusted under 35 U.S.C. 154(b) by 0 days.

(21) Appl. No.: 13/198,680

(22) Filed: Aug. 4, 2011

(65) Prior Publication Data

US 2012/0172068 A1  Jul. 5, 2012

Related U.S. Application Data

(63) Continuation of application No. 12/214,983, filed on Jun. 23, 2008, now abandoned, which is a continuation of application No. 10/634,143, filed on Aug. 4, 2003, now abandoned, which is a continuation of application No. PCT/ES02/00072, filed on Feb. 15, 2002, now abandoned.

(30) Foreign Application Priority Data

Feb. 15, 2001  (ES) .................................. 200100348

(51) Int. Cl.
| | |
|---|---|
| *H04W 4/00* | (2009.01) |
| *H04W 4/12* | (2009.01) |
| *H04W 4/14* | (2009.01) |
| *H04M 3/42* | (2006.01) |
| *H04L 29/08* | (2006.01) |
| *H04L 12/58* | (2006.01) |

(Continued)

(52) U.S. Cl.
CPC ............. *H04W 4/14* (2013.01); *H04L 12/5835* (2013.01); *H04L 51/066* (2013.01); *H04L 67/04* (2013.01); *H04L 67/02* (2013.01); *H04L 1/16* (2013.01); *H04L 12/5895* (2013.01); *H04W 88/184* (2013.01); *H04W 92/02* (2013.01); *H04W 92/24* (2013.01)
USPC ...................... 455/466; 455/414.1; 455/414.4

(58) Field of Classification Search
CPC ..... H04W 4/14; H04W 88/02; H04W 72/005; H04W 88/184; H04W 4/12; H04L 67/02; H04M 1/72552
USPC .................................. 455/414.1–414.4, 466
See application file for complete search history.

(56) References Cited

U.S. PATENT DOCUMENTS 6,370,389 B1 * 4/2002 Isomursu et al. ............. 455/466
6,400,942 B1 * 6/2002 Hansson et al. ........... 455/426.1

(Continued)

FOREIGN PATENT DOCUMENTS

| EP | 0777394 | 6/1997 |
|---|---|---|
| EP | 0959600 | 11/1999 |

(Continued)

*Primary Examiner* — Matthew Sams
(74) *Attorney, Agent, or Firm* — Klauber & Jackson LLC

(57) ABSTRACT

It allows the transmission of short messages (SMS) between a remote server (1) and a mobile telephone user (7), that is in communication with a short message service center (5) via GSM network 10. It is characterized in that remote server (1) communicates with the short message server (5) via a hypertext transfer protocol (http), for which both server (5) and remote server (1) have means of bi-directional transmission/reception (2, 3, 8 and 9) of the short message via the Internet protocol (http).

18 Claims, 8 Drawing Sheets

(51) Int. Cl.
*H04L 1/16* (2006.01)
*H04W 88/18* (2009.01)
*H04W 92/02* (2009.01)
*H04W 92/24* (2009.01)

(56) References Cited

U.S. PATENT DOCUMENTS 6,449,473 B1 * 9/2002 Raivisto .................... 455/410
6,751,463 B1 * 6/2004 Lorello et al. ................ 455/466
6,891,811 B1 * 5/2005 Smith et al. .................. 370/310
6,920,331 B1 * 7/2005 Sim et al. ..................... 455/466

FOREIGN PATENT DOCUMENTS

EP          1091607          4/2001
WO        WO 0180534       10/2001

* cited by examiner

SYSTEM FOR INTERCONNECTING A REMOTE SERVER WITH A SHORT MESSAGE SERVER CENTRE (SMSC) VIA THE INTERNET

RELATED APPLICATIONS

The present application is a Continuation of application Ser. No. 12/214,983, filed Jun. 23, 2008 now abandoned, which is in turn, a continuation of application Ser. No. 10/634,143, filed Aug. 4, 2003, now abandoned, which is in turn, a continuation of PCT Application No. PCT/ES02/00072, filed Feb. 15, 2002, also abandoned, which in turn, claims priority from Spanish Application Serial No. 200100348, filed Feb. 15, 2001. Applicants claim the benefits of 35 U.S.C. §120 as to the U.S. applications and the PCT application and priority under 35 U.S.C. §119 as to said Spanish application, and the entire disclosures of all applications are incorporated herein by reference in their entireties.

OBJECT OF THE INVENTION

The object of the invention in question, as stated in the title to this descriptive specification, is to allow the bi-directional transmission of short messages between a remote server and a mobile telephone user through Internet, and more specifically on http protocol (hypertext transfer protocol).

BACKGROUND OF THE INVENTION

The transmission of short messages among mobile telephony users is well-known in the state of the art, for which said users communicate through the GSM (global system for mobile) network with a short message service centre SMSC of a mobile telephony operator.

Given the importance of the added value of short messages, these have been introduced such that a remote server, a service provider for example, uses the applications based on short messages in multiple applications such as news, queries, alarms, etc.

At the present time it is necessary to have an SMSC to be able to give services of this type, so that many applications are developed in cooperation between the provider and a mobile telephony network operator.

In general, in order that a service provider can offer messaging to GSM users, he must contact a mobile telephony operator and the latter facilitates a dedicated access to the short message centre for his use. This results in the implementation of this type of application being slow due to the process involved in the installation of a dedicated line in the service company and to the work to be carried out with the complex and not very widespread SMS protocols.

Hence, the costs in material, connection and manpower to deploy this type of service are high. Also, the mobile telephony operator has to furnish the service provider with a telephone number for access and a direct access line to the SMSC, so that he may offer some not very stringent safety levels.

Hence, permitting a remote server, dedicated to message services, to be able to send short messages to mobile telephony users, implies high costs and long implementation times for this type of service.

International publication EP0777394 discloses a mail service gateway coupled between at least one network wherein an electronic mail service is supported and a network for mobile communication wherein a short message service is supported. The mail service gateway decomposes an incoming electronic mail message and embeds successive parts thereof in successive short messages which are then transmitted through the network for mobile communication towards a mobile terminal. A short message processing device which may be included in the mobile terminals to make the mail service gateway transparent is also disclosed.

International publication EP0959600 discloses a communication system that has a plurality of wireless communication devices coupled through a plurality of wireless network carriers providing wireless communication services thereto using a different combination of network type and transport protocol. A multi-network gateway couples the wireless network carriers to a network of computers containing information therein to facilitate data transfer therebetween. The wireless network carriers are coupled to the network of computers by an airlink configured for the particular combination of network type and protocol, and each of the airlinks operate to exchange data with certain of the wireless communication devices via the wireless network carriers associated therewith.

DESCRIPTION OF THE INVENTION

To overcome the drawbacks mentioned above, the invention has developed a new system that permits the interconnection of a remote server with a message service centre to be carried out through Internet and more specifically the invention is characterized in that the remote server communicates with the SMSC via the Internet hypertext transfer protocol (http); for which both the SMSC and the remote server have means of bi-directional transmission/reception of short messages via http.

The transmission/reception means of the SMSC and of the remote server, are defined by a client module and a server module; client modules comprising a block for composing short messages adapted to the http protocol (SMS-http), which composes SMS messages adapted for their transmission via the Internet http protocol. Client modules also comprise a block for transmission of the SMS-http messages to the server module to which it is desired to send them.

Regarding the server modules of the SMSC and of the remote server, these comprise an SMS-http message reception block and the server module of the mobile telephony operator has a block for composing the SMS proper, which composes the SMS message from the SMS-http message.

This system has the great advantage that it implies a considerable saving in costs, since practically the entirety of the remote servers have connections to Internet as well as client modules and http server modules, based on which the system of the invention is implemented, apart from its costs being very low.

This solution also has the great advantage that the SMS protocols are only implemented once in the client module—server module of the mobile telephony operator, which eliminates the costs of each implementation of these protocols on the part of each new service provider. These features also mean no information need be offered to the providers on the internal procedures and facilities of the mobile telephony operator, since for the remote servers, it is only necessary to know the connection data with the http server which reads this protocol.

The server modules of the invention comprise a data analysis block that has access to a database to verify the data of the originator, of the message addressee, and of the access code, and as a function of this verification, it generates a return code signalling that these data are correct or on the contrary they are errored.

To this end it has been foreseen that the server modules have a block for generating return codes to indicate this circumstance, and also, in the event there has been an error to signal the type of error produced. Clearly client modules have a block for reception of return codes in order to know if the data are correct or errored, and in this last case, the type of error produced.

Another feature of the invention consists in that client modules comprise a means of calculating additional safety functions, as for example can be HASH functions used conventionally in commercial transactions through Internet.

Obviously the server modules have to comprise a means of verifying the HASH security functions in order to generate a return code that accepts or denies the communication as a function of the HASH sent and obtained.

This feature provides an additional advantage, by offering greater security than that conventionally provided by the conventional short message system, since it allows identification of the service providers, the telephone numbers to which the messages are directed and the content of the messages, as well as the application of security rules and usage restrictions and statistics on use.

In an embodiment of the invention, client modules have encoding means that are complemented with decoding means foreseen in the server modules, to allow more characters and symbols to be sent/received.

Thus, the encoding/decoding means carry out base64 encoding/decoding, which as is known allows 8-bit working in 7-bit environments, whereby twice the characters are obtained than with 7 bits.

The SMS message composition block of the server module of the SMSC has means for translation from the SMS-http message to GSM characters. This translation is carried out before composing the SMS messages and after base64 decoding in the event of this being necessary, to allow the SMS messages to be sent via the GSM network.

The invention also contemplates the possibility that client modules or server modules have information segmentation means to send longer messages.

In any one of the two cases, the segmentation means are foreseen in the message composition block.

When sending messages, mandatory and optional parameters of short messages are transmitted.

Also, the short message composition block of the server module, has means to recover the mandatory and optional parameters, and in the event that these last optional parameters are omitted, it inserts default values.

The invention foresees that client modules include means for acknowledgement of receipt generation, which signals are sent through the message transmission block to the corresponding server module.

Client modules also have means for transmission of the result of the acknowledgement of receipt, to the server module of the client module that generated the acknowledgement of receipt request in the first instance.

In this case a return code is also generated to indicate that the transmission was correct or was errored. Both for this case and for those mentioned above, the server modules have a return code generation block which indicates that the transmission was correct or was errored, and in this last case it identifies the type of error produced; and the client modules also have a return code reception block to detect the return code sent.

The system of the invention also comprises means of reattempting, a certain number of times, transmission of failed messages and of reattempting, a certain number of times, transmission of acknowledgement of receipt messages in order to achieve greater reliability in message transmission.

Based on the description provided it can be easily understood that the SMS can be sent from the remote server to the mobile telephony user, in the reverse direction, or in both directions.

In an embodiment of the invention the client module and the server module of the operator of the mobile telephony network are shared by a plurality of remote servers, so that more complex services can be furnished like for example services offered simultaneously by several providers, for which the client module and the server module of the mobile telephony operator have means for simultaneous communication with a plurality of remote servers to furnish simultaneous connection of a plurality of remote servers with a mobile telephone user.

Below, to facilitate a better understanding of this descriptive specification and being an integral part thereof, a series of figures is attached wherein, by way of illustration and not restrictively the object of the invention is shown.

DESCRIPTION OF AN EMBODIMENT OF THE INVENTION

Figure 1:
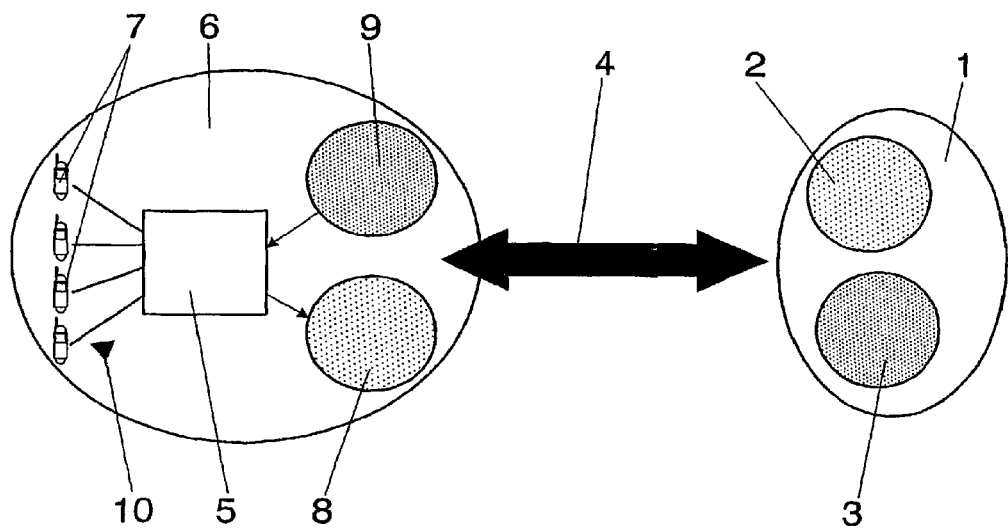
FIG. 1.—It shows a functional block diagram of the general structure of a possible example of embodiment of the system of the invention.

A description is provided below of the invention based on the aforementioned figures.

The remote server 1, as for example may be a service provider, has a client module 2 and a server module 3 which communicates through Internet 4 with a short message service centre 5 (SMSC), of a mobile telephony operator 6, which communicates with a plurality of mobile telephones 7 via GSM network 10.

The SMSC 5 communicates with a server module 9 and with a client module 8 to allow the transmission through Internet of short messages, such as is explained below.

Figure 2:
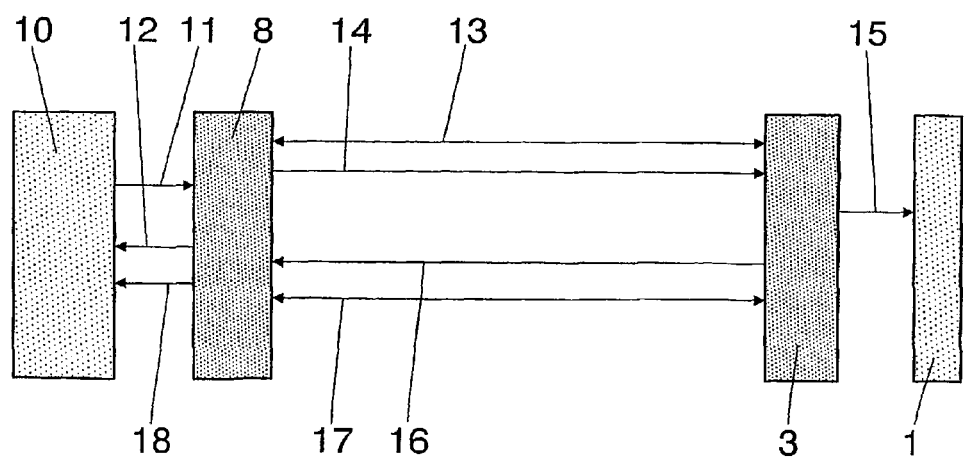
FIG. 2.—It shows an explanatory functional block diagram of the case in which it is the mobile telephony user that sends a short message to the remote server.

In the event that it is desired to send SMS messages from a mobile telephone user 7 to a remote server 1, the short message is sent in a conventional way from a mobile telephone 7 via GSM network 10 to the SMSC 5. This communication is shown in FIG. 2 with reference 11.

According to the protocol used, client module 8 can confirm to GSM network 10 that it has received the message by returning a reception correct or errored signal, which has been referred to with 12.

The short message received by client module 8, is converted, as shall be explained below, into a short message adapted to the http protocol (hypertext transfer protocol) (SMS-http) over the Internet 4 system.

Thus, a connection 13 is set up through Internet between client module 8 and server module 3.

Next client module 8 makes a transmission request 14 for the SMS-http message which is received by server 3 and converts it into the short message proper, as shall be explained below, and delivers 15 it to service provider 1, where it is processed according to requirements to obtain the SMS emitted in origin.

Subsequently server module 3 responds with a return code 16 by means of which it indicates whether the transmission has been correct or not and in the event of an error having occurred, it indicates the proximate cause that has produced the error, to facilitate its repair and thereafter closes 17 the connection 13.

The possibility is present that when making request 11, an acknowledgement of receipt request is sent, in which case client module 8, after receiving return code 16, sends acknowledgement of receipt 18 to the GSM network.

Figure 3:
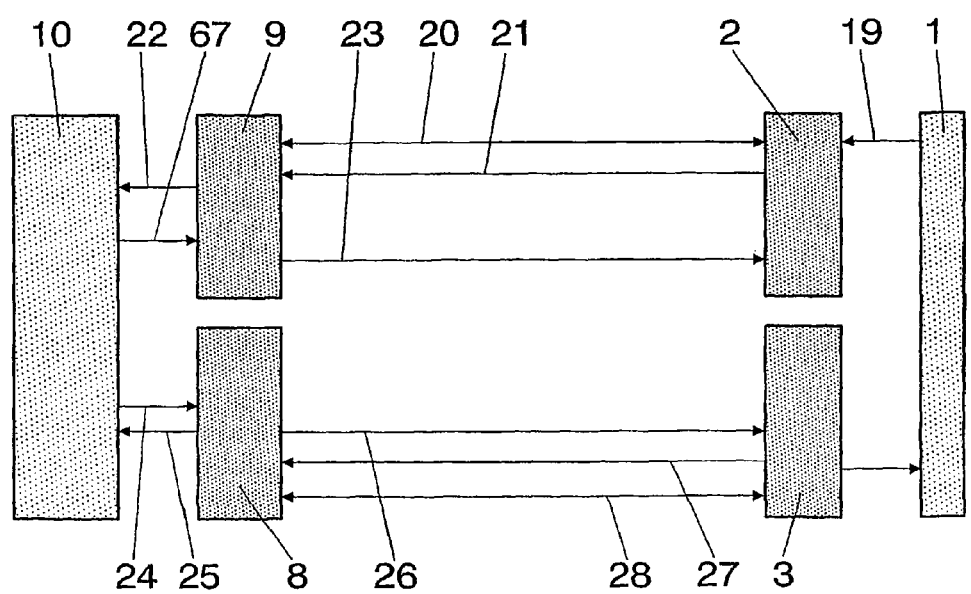
FIG. 3.—It shows an explanatory functional block diagram of the case in which it is the remote server that sends a short message, with acknowledgement of receipt, to a mobile telephone user.
Figure 4:
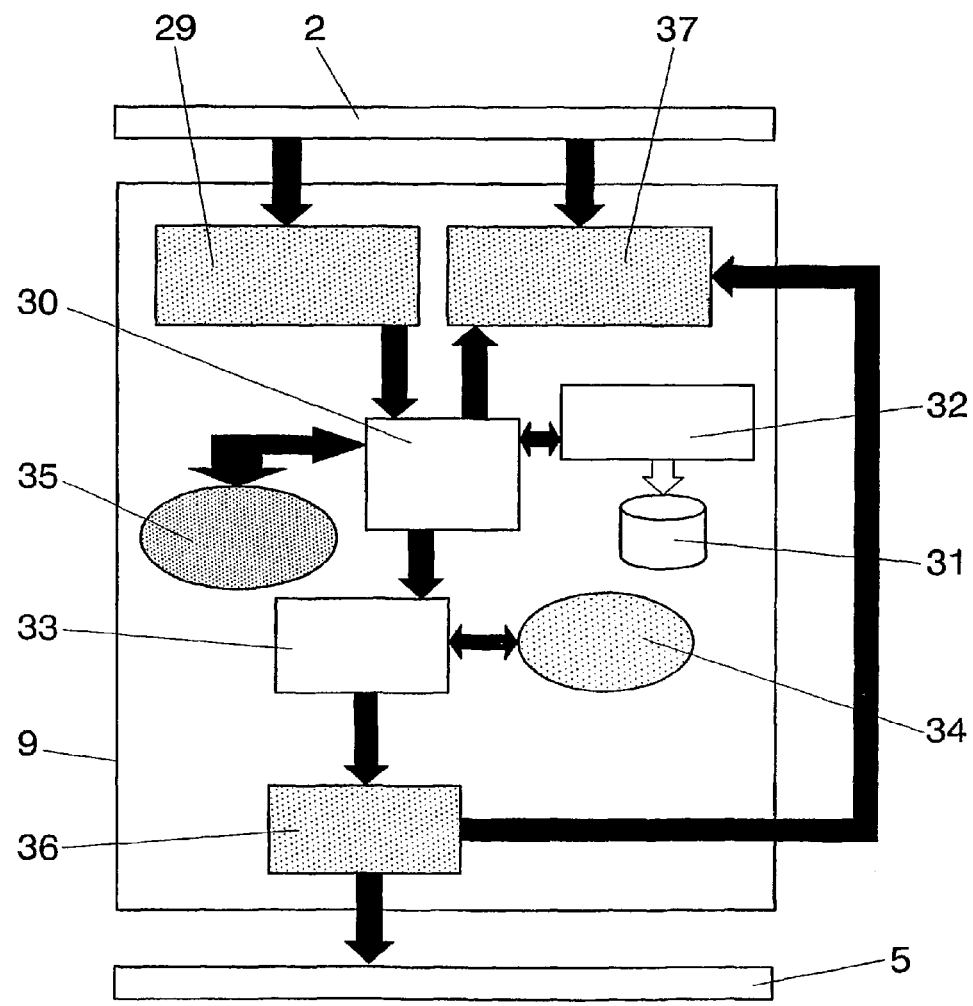
FIG. 4.—It shows a functional block diagram of the server module of the operator of the mobile telephony network.

Based on FIG. 3 the case is described wherein the short message has been sent from a service provider 1 to GSM network 10.

In this case, the provider 1 makes a short message transmission request 13 which is managed through client module 2. To which end the short message is adapted to the http protocol, subsequently establishing an SMS-http message transmission request 21 to server module 9, which composes the short message proper from the SMS-http message.

As from this point in time server module 9 sends 22 the short message to GSM network 10. In this case, as in the previous one, depending on the protocol used, it can recover a data correct or data errored code, which has been represented by means of the line 67 whereby it is indicated if the message format is correct and has reached the SMSC 5. It has to be pointed out that this code does not correspond to final delivery of the message, since this is confirmed with the acknowledgement of receipt, as was commented in the previous case, as shall be commented below.

In this case, server module 9 generates 23 a return code by means of which it is indicated whether the transmission has been correct or not, and in the event of an error, it identifies the proximate cause to facilitate its repair.

In the event that original message 21 includes an acknowledgement of receipt request, this is sent 24 to client module 8 via GSM network 10 and sends 26 the acknowledgement of receipt to server module 3 which generates return code 27 and the connection is closed 28.

Within the short message information sent, mandatory parameters are transmitted that are inserted in request 21, in the same way that the call arguments are introduced conventionally in a CGI (common gateway interface) in http protocols. Such parameters are the destination number of the message, the content of the message (text) and a univocal label that will serve for aggregating other messages, like the acknowledgement of receipt for example, and performing the tracking thereof.

Also, as shall be explained below, the text of the message can be encoded.

Apart from the mandatory parameters other omissible or optional parameters also exist, which indicate configuration values for the short message to be sent.

These optional parameters are sent following the structure of the standard http headers.

In the event that these parameters are omitted, default values can be allocated in server 9 or 3 which receives the request.

Thus, a service provider 1 that has to furnish service quickly, can do so by sending only the mandatory parameters. Also, the possibility exists of including some of the optional parameters as if they were mandatory, whereby the general process of transmission is simplified.

A great part of the parameters indicates data concerning the short message which the server module will send when it receives the request. Thus parameters exist to indicate the data coding scheme (DCS), the protocol identifier (PDI), the type of number (TON), the numbering plan indicator (NPI), the user data header indicator (UDHI), originating address, validity period, priority and whether the acknowledgement of receipt is requested or not.

There are also other parameters characteristic of the present invention, such as the user and the password of the message originator to check that it is a user with permits for said operation, base64 code, HASH and segmentation of messages to allow longer messages to be sent.

To achieve the aforementioned functionality, server module 9 of the operator of the mobile telephony network 6, has a request reception block 29 which receives requests 21 and sends them to a data analysis block 30 wherein the received parameters are analysed, the originating address, the telephone number, destination, user in question and password thereof being detected, these parameters being checked in a database 31 through a query block 32.

Next the IP (Internet Protocol) address is checked, which identifies each computer and originating port against those allocated in the database, in order to authenticate the transmission.

Subsequently data analysis block 30 sends the short message to a short message composition block 33 which has access to a base64 decoder 34 to recover the original text which was previously encoded in client module 2, as shall be described below.

Next data analysis block 30 accesses a HASH verification block 35, wherein the HASH of the text is recalculated before applying the HASH to it and it is checked that it is identical to the HASH received.

In the event that all checks prove correct, the decoded message is translated to GSM characters; since it uses specific characters according to the standards in force. This translation is performed by short message composition block 33.

Also, short message composition block 33, if necessary, performs segmentation of the message. In this event, in order to know the maximum size of the message admitted by the mobile telephony network, it is calculated from the DCS parameter and the coding of the characters.

The short message composition block recovers the short message creation data: DCS, NPI, etc. and builds the new short messages. In the case in which the user data header indicator is not specified in the received message, the value of this is inserted, depending on whether the message has had to be segmented for exceeding the maximum size and the decoded text is introduced in the new short messages.

Next the composed short messages are sent to short message transmission block 36 which establishes connection with the SMSC 5 for transmission of the messages to GSM network 10.

In the event that there was an error in the transmission of the short message, it is reattempted up to a predefined maximum number of times.

Once transmission of the short message is over or the reattempts concluded, the return code is generated which is sent through a return code transmission block 37 which is connected with short message transmission block 36.

Figure 5:
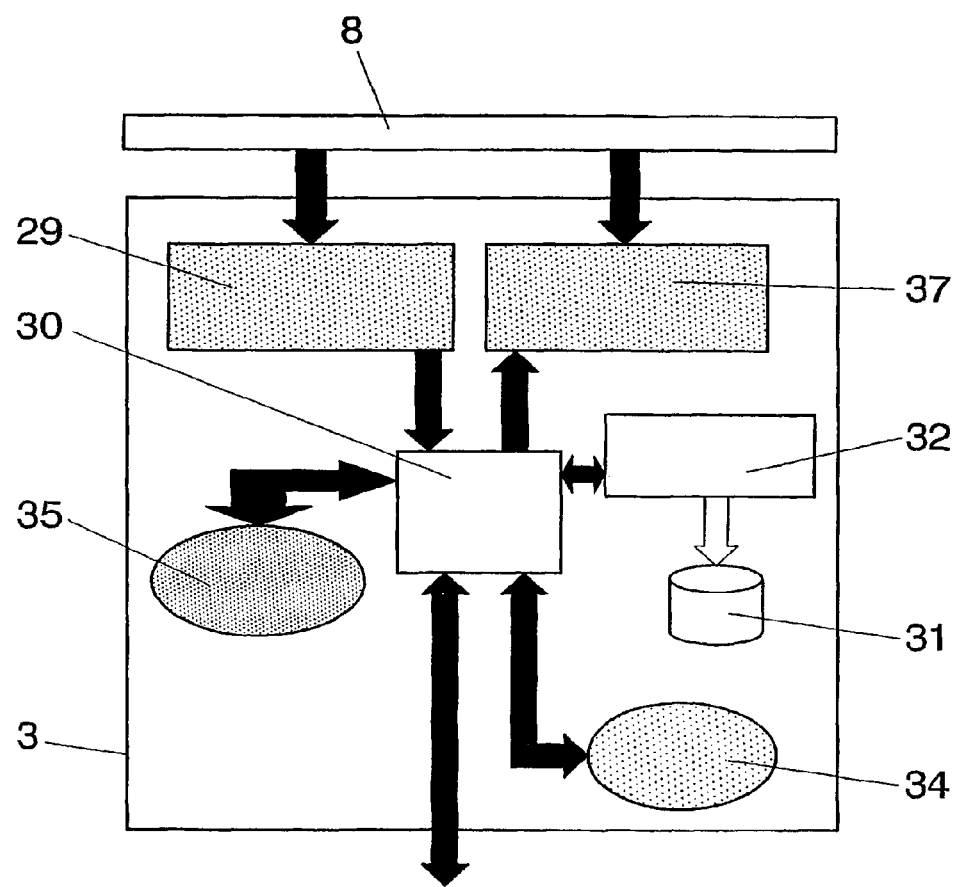
FIG. 5.—It shows a functional block diagram of the server module of the remote server.

FIG. 5 shows a functional block diagram and a server module 3 of a service provider 1. In this case the operation of server module 3 is identical to that of server module 9 but with the difference that in this case short message composition block 33 can be present or not, for which base64 decoding is carried out starting from data analysis block 30, and the result obtained is delivered to service provider 1 that processes the information according to requirements (SMS obtained). Clearly in this case there is no block for short message transmission to the mobile telephony network, nor is the GSM translator necessary, but return code transmission block 37 is required, which in this case is governed from service provider 1.

Figure 6:
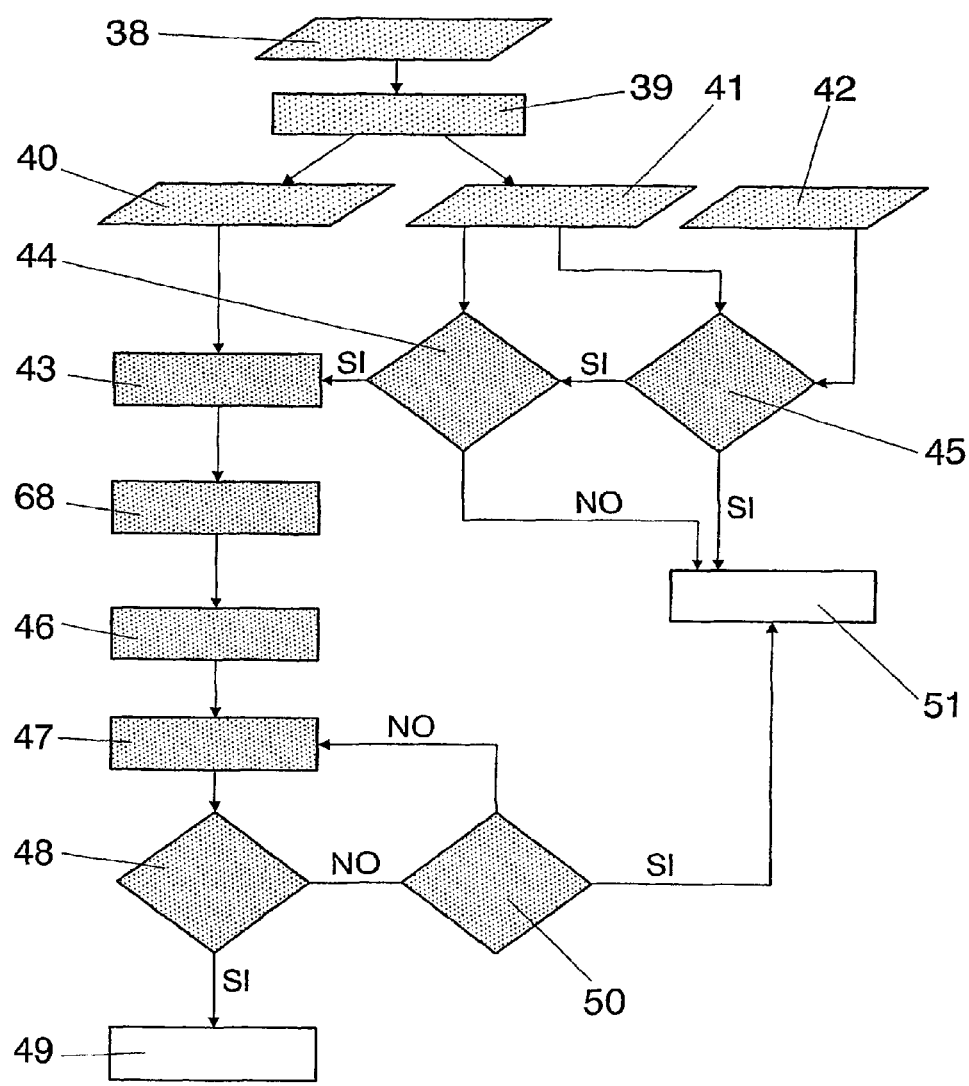
FIG. 6.—It shows a flow diagram of the operation of the server modules.

In FIG. 6 a flow diagram is shown of the operation of the modules of server 3 and 9, as was explained. In this flow diagram the following references are included: 38 new message, 39 represents the data analysis performed by data analysis block 30; 40 the mandatory parameters, 41 the optional parameters, 42 the access to database 31, 43 the base64 decoding carried out by decoder block 35; 44 represents the query to detect whether the HASH is correct, and if it is, to carry out the base64 decoding, and if otherwise it generates return code 16 by transmission of error code 51; reference 68 represents the translation of the encoded characters to GSM characters; reference 46 represents the segmentation and creation of short messages, 47 represents transmission of short messages; 48 queries whether the transmission is correct, and if affirmative performs the transmission of return code 16 by transmitting 49 for transmission correct and if otherwise it passes to reference 50 in which it is queried whether the predefined reattempts have been completed. If affirmative, return code 16 is generated sending an error code, whilst if otherwise transmission of short messages is resumed.

Figure 7:
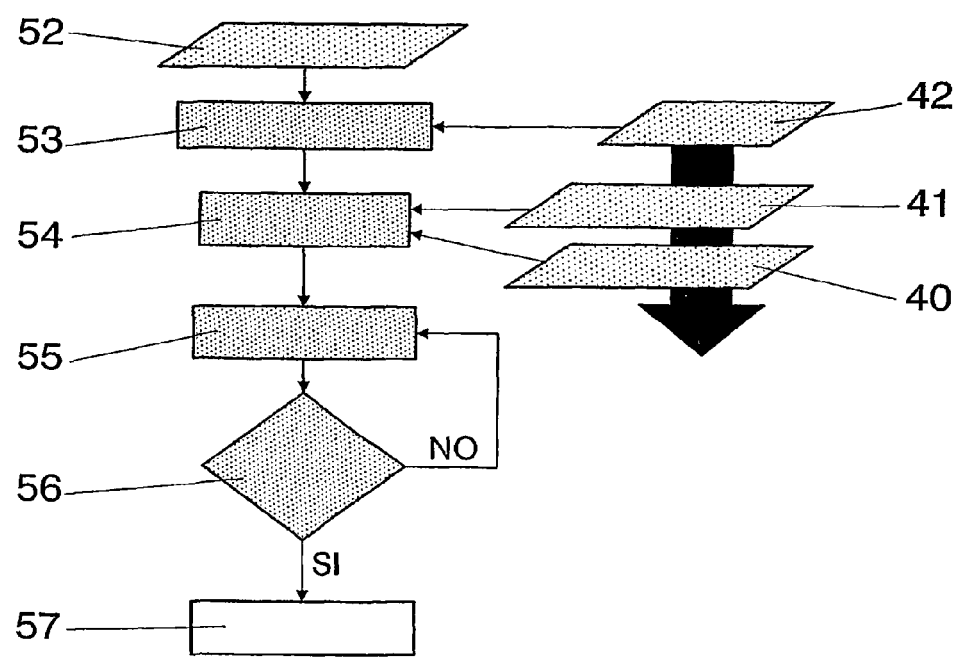
FIG. 7.—It shows a flow diagram of the operation of the server modules when acknowledgement of receipt is made.

FIG. 7 shows the flow diagram for the case in which acknowledgement of receipt is received in the server module, which has been represented with reference 52, reference 53 refers to the data analysis performed by data analysis module 30, references 40, 41 and 42 refer to the same case as that described for FIG. 6, that is, mandatory parameters, optional parameters and access to the database, with the difference that in this case a message is generated for transmission of acknowledgement of receipt 26, which is indicated by means of reference 55, and then by means of reference 56 it is queried whether the transmission has been correct, and if affirmative, the connection is closed, which has been represented by means of reference 57.

Figure 8:
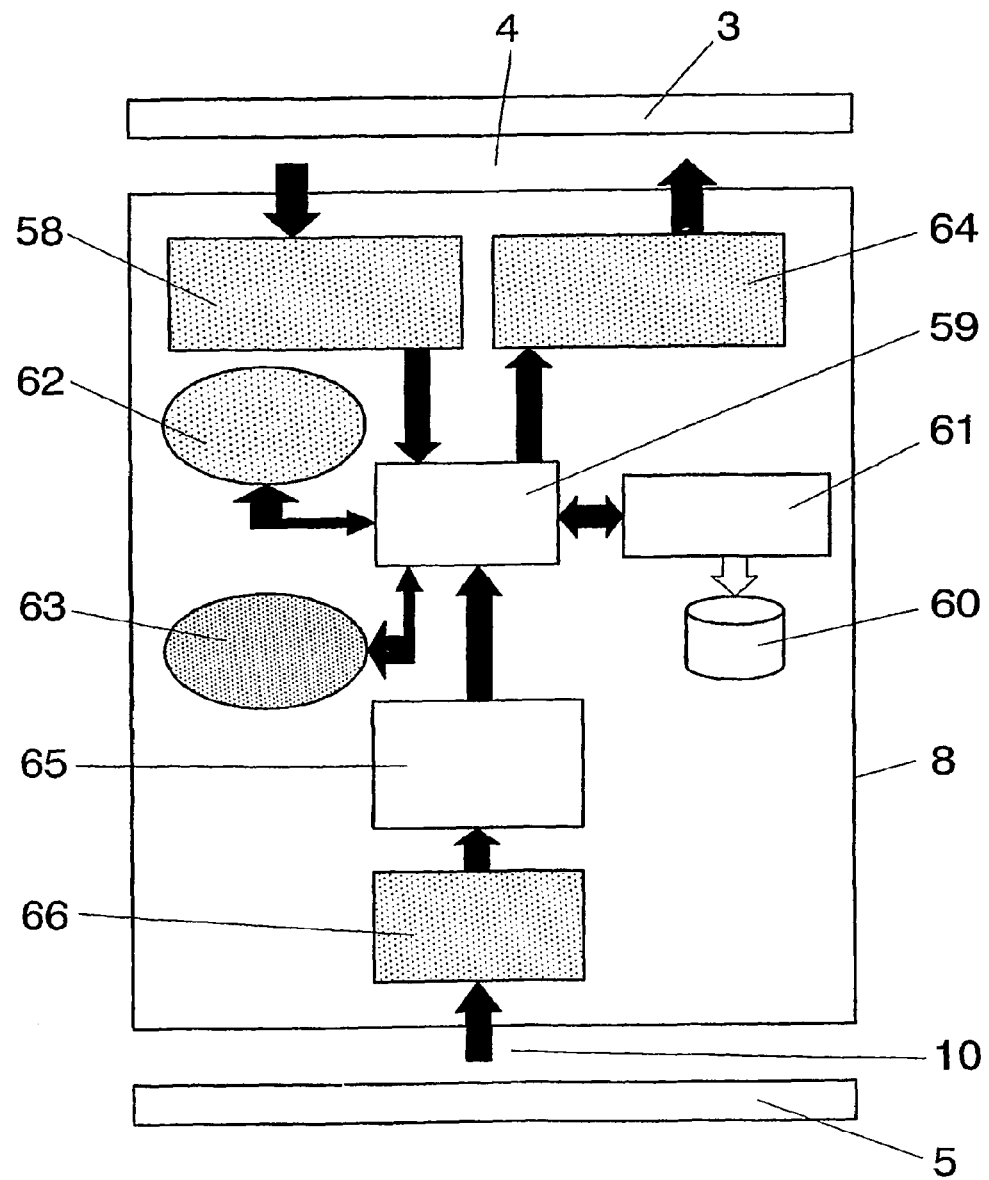
FIG. 8.—It shows a functional block diagram of the client module of the operator of the mobile telephony network.
Figure 9:
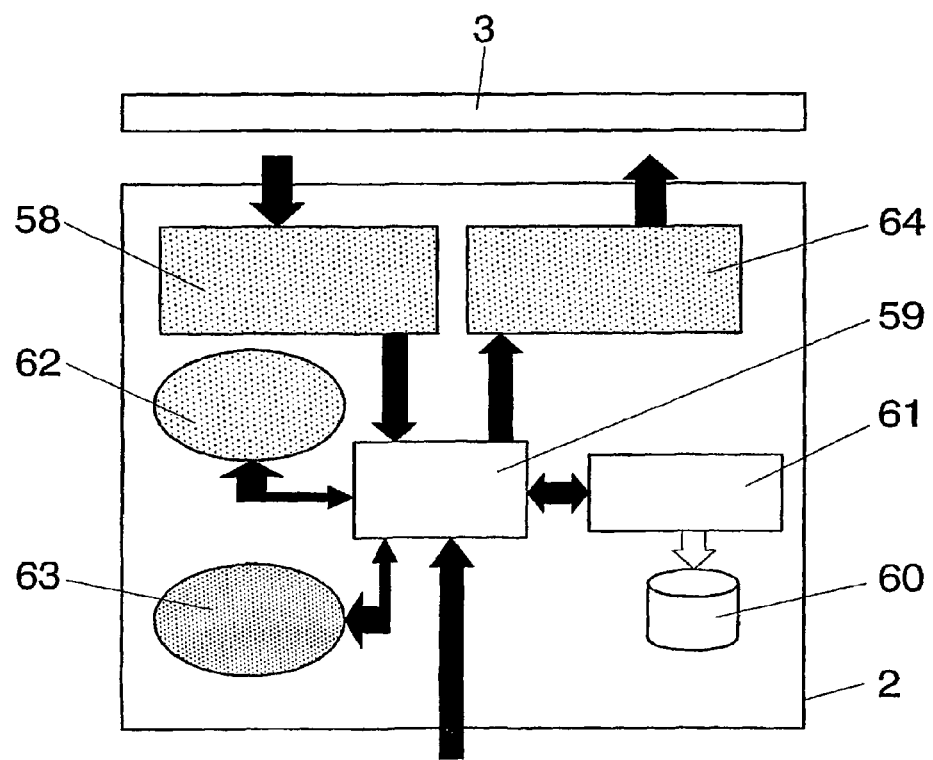
FIG. 9.—It shows a functional block diagram of the client module of the remote server.

With respect to FIG. 8, here the functional block diagram is shown of client module 8 of the mobile telephony operator 6, which, as has already been commented above receives the short message sent from the SMSC 5 which is carried out by a short message reception block 66.

Next the short message passes to a data analysis block of the short message 65 in which the IP protocol addresses are recovered to which the message should be sent and the authentication parameters of database 60, for which it delivers the short messages to a message composition block 59 which accesses a database 60 through a message composition block 59 which accesses the database 60 through a query block 61. Subsequently the message composition block 59 accesses a base64 encoder with reference 62, and a HASH calculator 63 to calculate said HASH and compose the short message, after translation of the parameters of the short message received, composing the message by linking all the data according to an SMS-http message scheme and sending them to server module 3 of service provider 1.

Subsequently return code 16 is recovered through a return code reception block 58 and in the event of error a previously established number of reattempts is carried out.

Also, client module 8 carries out recovery of the acknowledgement of receipt, if required, for which it recovers the identifier of the IP protocol address message and the port or ports to which the acknowledgement of receipt should be sent (address of the server module of service provider 1).

Next it sends acknowledgement of receipt 26, and return code 27 is recovered, carrying out the reattempt of acknowledgement of receipt transmission, in the event that it has not been carried out correctly, for a predetermined number of times.

FIG. 3 shows the functional block diagram of client module 2 of service provider 1, the structure of which is basically the same as that described for the case of client module 8, with the difference that in this case the short message to be sent does not come from the SMSC 5, but instead it comes directly from service provider 1, which furnishes the information it is desired to send to message composition block 59, proceeding from this point in the manner described for the previous example.

In this case it is not deemed necessary to provide the operational flow, since it is deduced clearly from the description made.

The invention claimed is:

1. SYSTEM OF INTERCONNECTING A REMOTE SERVER WITH A SHORT MESSAGE SERVICE CENTRE (SMSC) THROUGH THE INTERNET, which is provided with means for sending and receiving short messages (SMS) between a remote server (1) and a mobile telephone user (7), which is in bi-directional communication with a short message service centre (5) (SMSC) on a GSM network (10), existing bi-directional transmission/reception of messages between the remote server (1) and the mobile telephone user (7), which is capable of at least two separate and simultaneous connections, wherein the communication may be originated in both the mobile telephone user (7) and the remote server (1) in an independent way, said remote server (1) being provided with means for communicating with the SMSC (5) via an Internet hypertext transfer protocol (http), for which the SMSC (5) is provided with first means of bi-directional transmission/reception (8,9) of short messages via the protocol (http), and the remote server (1) is provided with second means of bi-directional transmission/reception of short messages via the protocol (http);

wherein that the first (8, 9) and second (2, 3) means of transmission/reception each comprises a client module (2,8) for the composition and transmission of messages, and a server module (3,9) for the reception of messages, client modules (2,8) comprising an SMS-http message composition block (59) which is provided with means for composing short messages adapted for their transmission via the Internet http protocol, in which SMS messages convert into http messages directly, also being provided with a block for transmission of SMS-http messages (64) to server module (3,9) to which is intended to send them; and server modules (3,9) comprising an SMS-http message reception block (29) and a data analysis block (30) which is provided with access to a database (32) provided with means for verifying the data of originator, addressee of the message and access code, and as a function of this verification is also provided with means for generating a return code (23) signaling data correct or data errored.

2. SYSTEM OF INTERCONNECTING A REMOTE SERVER WITH A SHORT MESSAGE SERVICE CENTRE (SMSC) THROUGH THE INTERNET, according to claim 1, characterised in that server module (9) of the SMSC (5) comprises a composition block of SMS messages proper (33) which composes said SMS message from the SMS-http message.

3. SYSTEM OF INTERCONNECTING A REMOTE SERVER WITH A SHORT MESSAGE SERVICE CENTRE (SMSC) THROUGH THE INTERNET, according to claim 1, characterised in that client modules (2, 8) comprise means (35) of calculating HASH security functions (63); and in that the server modules (3, 9) comprise means of confirming the HASH security functions (35); in order to generate a return code (27) which enables or denies a connection as a function of the HASH sent and obtained.

4. SYSTEM OF INTERCONNECTING A REMOTE SERVER WITH A SHORT MESSAGE SERVICE CENTRE (SMSC) THROUGH THE INTERNET, according to claim 3, characterised in that SMS composition block (33) of the server module of the SMSC (5) has means of translating from the SMS-http message to GSM characters, prior to composing the SMS message, to allow this to be sent via the GSM network.

5. SYSTEM OF INTERCONNECTING A REMOTE SERVER WITH A SHORT MESSAGE SERVICE CENTRE (SMSC) THROUGH THE INTERNET, according to claim 1, characterised in that client modules (2, 8) have encoding means (62) and server modules (3, 9) have decoding means (34), to allow more characters and symbols to be sent/received.

6. SYSTEM OF INTERCONNECTING A REMOTE SERVER WITH A SHORT MESSAGE SERVICE CENTRE (SMSC) THROUGH THE INTERNET, according to claim 5, characterised in that the encoding (63) and decoding (35) means, perform base64 encoding/decoding.

7. SYSTEM OF INTERCONNECTING A REMOTE SERVER WITH A SHORT MESSAGE SERVICE CENTRE (SMSC) THROUGH THE INTERNET, according to claim 1, characterised in that client modules (2, 8) have means of segmentation of the information in order to send longer messages.

8. SYSTEM OF INTERCONNECTING A REMOTE SERVER WITH A SHORT MESSAGE SERVICE CENTRE (SMSC) THROUGH THE INTERNET, according to claim 7, characterised in that the means of segmentation of client module (2, 8) are foreseen in message composition block (59).

9. SYSTEM OF INTERCONNECTING A REMOTE SERVER WITH A SHORT MESSAGE SERVICE CENTRE (SMSC) THROUGH THE INTERNET, according to claim 1, characterised in that server modules (3, 9) have means of segmentation of the information in order to send longer messages.

10. SYSTEM OF INTERCONNECTING A REMOTE SERVER WITH A SHORT MESSAGE SERVICE CENTRE (SMSC) THROUGH THE INTERNET, according to claim 9, characterised in that the means of segmentation of server module (3, 9) are foreseen in message composition block SMS (33).

11. SYSTEM OF INTERCONNECTING A REMOTE SERVER WITH A SHORT MESSAGE SERVICE CENTRE (SMSC) THROUGH THE INTERNET, according to claim 1, characterised in that mandatory and optional parameters of the short messages are sent.

12. SYSTEM OF INTERCONNECTING A REMOTE SERVER WITH A SHORT MESSAGE SERVICE CENTRE (SMSC) THROUGH THE INTERNET, according to claim 11, characterised in that short message composition block (33) of server module (3, 9) is provided with means for recovery of the mandatory and optional parameters, and in the event that the optional parameters are omitted it is provided with means for inserting default values.

13. SYSTEM OF INTERCONNECTING A REMOTE SERVER WITH A SHORT MESSAGE SERVICE CENTRE (SMSC) THROUGH THE INTERNET, according to claim 1, characterised in that client modules (2, 8) have means of generating acknowledgement of receipt, which are sent through message transmission block (64) to the corresponding server module (3, 9) and in that client modules (2, 8) also have means of transmitting the result of the acknowledgement of receipt to server module (3, 9) of client module (2, 8) that generated the acknowledgement of receipt in the first instance.

14. SYSTEM OF INTERCONNECTING A REMOTE SERVER WITH A SHORT MESSAGE SERVICE CENTRE (SMSC) THROUGH THE INTERNET, according to claim 2, 3 or 13, characterised in that server modules (3, 9) are provided with a return code transmission block (37) provided with means for indicating that the transmission has been correct or has been errored; and in this last case also provided with means for identifying the type of error produced; the client modules (2, 8) being also provided with a return code reception block (58).

15. SYSTEM OF INTERCONNECTING A REMOTE SERVER WITH A SHORT MESSAGE SERVICE CENTRE (SMSC) THROUGH THE INTERNET, according to claim 13, characterised in that means of reattempting transmission of failed messages a certain number of times have been foreseen and of reattempting transmission of acknowledgement of receipt messages a certain number of times.

16. SYSTEM OF INTERCONNECTING A REMOTE SERVER WITH A SHORT MESSAGE SERVICE CENTRE (SMSC) THROUGH THE INTERNET, according to claim 1, characterised in that means of reattempting transmission of failed messages a certain number of times have been foreseen and of reattempting transmission of acknowledgement of receipt messages a certain number of times.

17. SYSTEM OF INTERCONNECTING A REMOTE SERVER WITH A SHORT MESSAGE SERVICE CENTRE (SMSC) THROUGH THE INTERNET, according to claim 1, characterised in that the SMS is sent from remote server (1) to the mobile telephone user (7) and/or from the mobile telephone user (7) to remote server (1).

18. SYSTEM OF INTERCONNECTING A REMOTE SERVER WITH A SHORT MESSAGE SERVICE CENTRE (SMSC) THROUGH THE INTERNET, according to claim 1, characterised in that client module (8) and server module (9) of the operator of the mobile telephony network (6) have means of simultaneous communication with a plurality of remote servers (1), to furnish simultaneous connection to a mobile telephone user (7) with a plurality of remote servers (1).

* * * * *